United States Patent [19]
Warner

[11] Patent Number: 4,567,691
[45] Date of Patent: Feb. 4, 1986

[54] ARRANGEMENT FOR A WINDOW PANE, ADJUSTABLE IN HEIGHT
[75] Inventor: Hermann Warner, Trabur, Fed. Rep. of Germany
[73] Assignee: General Motors Corporation, Detroit, Mich.
[21] Appl. No.: 595,732
[22] Filed: Apr. 2, 1984
[30] Foreign Application Priority Data
   Apr. 7, 1983 [DE] Fed. Rep. of Germany ....... 3312473
[51] Int. Cl.⁴ ............................................ E05F 11/38
[52] U.S. Cl. ........................................ 49/374; 49/440
[58] Field of Search ................. 49/374, 348, 440, 372, 49/502, 360
[56] References Cited
   U.S. PATENT DOCUMENTS
   4,240,227 12/1980 Hasler et al. ............... 49/374 X
   4,418,498 12/1983 Wanlass et al. ............. 49/348 X
   4,483,100 11/1984 Blankenburg et al. ....... 49/374 X
   4,490,942 1/1985 Arnheim et al. ............. 49/374

Primary Examiner—Philip C. Kannan
Attorney, Agent, or Firm—William A. Schuetz

[57] ABSTRACT

In an arrangement for a vertically adjustable window pane which is disposed flush with the adjacent body panels, the guide means for the window pane are to be inserted into the guide tracks laterally from the outboard side of the vehicle. This objective is being achieved in that the guide means on the rearward edge of the window pane is disposed in a forwardly pointing direction and is adapted to engage into a rearwardly facing opening of an elongate guide member, and in that the projecting guide portions of the guide means on the forward edge of the window pane are adapted for insertion substantially transversely of the window pane into the associated guide track through openings provided therein and are guided within the guide track in all directions.

13 Claims, 11 Drawing Figures

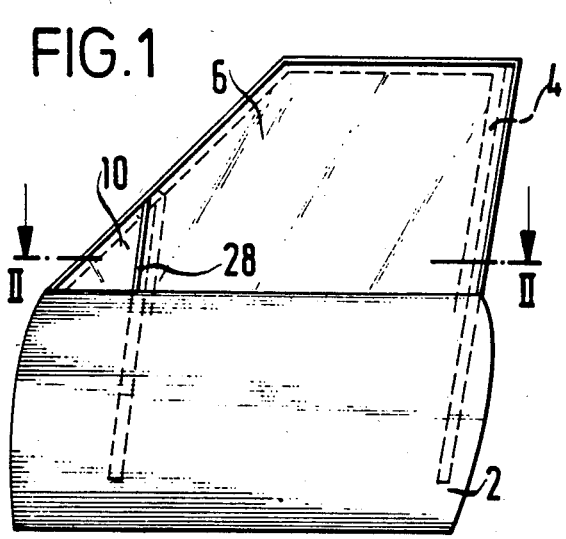
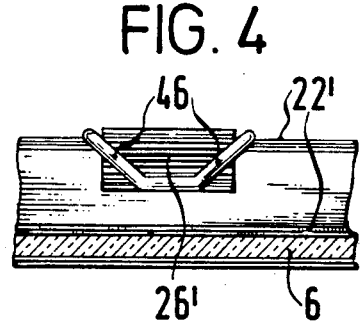
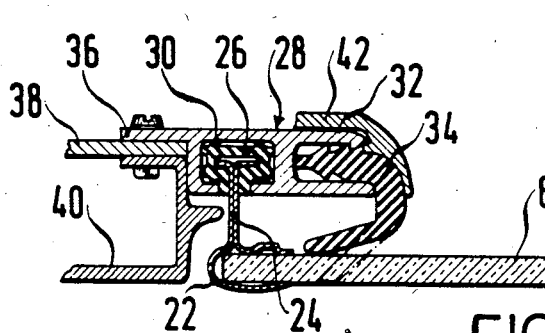
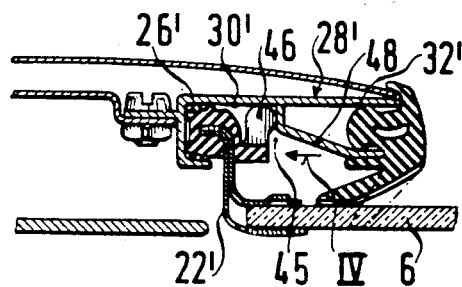
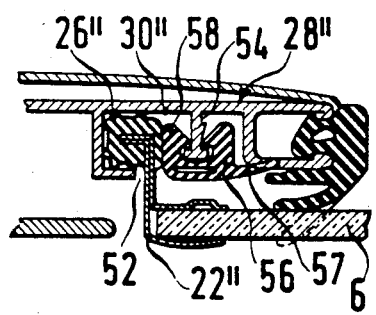
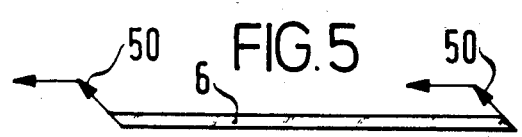

ARRANGEMENT FOR A WINDOW PANE, ADJUSTABLE IN HEIGHT

The invention relates to a vertically adjustable window pane, especially for use in motor vehicles, which is flush with the adjacent body panels, and including sealing and guide means which are disposed inboard the vehicle, the guide means being provided with projecting portions that engage in guide channel members.

The problem to be resolved with window arrangements of this type is that of providing means that permit guiding the window pane longitudinally in a satisfactory manner. While suitable window guide means have been proposed in the past, there is still the problem of how to insert the window pane with its guide means into the guide member. With conventional methods in the manufacture of doors, it is common practice that the doors, together with the inner and outer panels that are connected to one another, and together with the window frame, are set up so as to be ready for further assembly operations, i.e., for installation of the window pane. However, the problem of inserting the window pane with its guide means into the guide channels of the window frame is not amenable to easy solution.

Therefore, it is an object of the present invention to provide an arrangement which permits the guide means of the window frame to be inserted into the guide tracks laterally from the outboard side, a procedure that affords simplified assembly. The novel feature also provides that the window pane is properly guided longitudinally so as to provide optimum wear and prolonged service life. This object is to be achieved by way of simple and economical means while ensuring operational reliability that is equal or better than in prior art arrangements.

The above-mentioned objective is achieved in that the projecting portions of the guide means provided on the rearward edge of the window pane are arranged in a forwardly directed position and are adapted to engage into a rearwardly open guide channel, and in that the projecting portions of the guide means provided on the forward edge of the window pane are adapted for insertion substantially transversely of the window pane through cutouts provided in the associated guide channel so as to be retained and to be guided therein in all directions. With this arrangement, the installation of the window pane into the door proceeds in that the projecting portions of the rearwardly disposed guide means are inserted longitudinally into the guide track, and the projecting portions of the forwardly disposed guide means are inserted into the guide track in a direction substantially transversely or obliquely thereof. Naturally, in the case of rear doors, the arrangement is reversed, i.e., that which has been said for the rearward edge holds true for the forward edge, and vice versa.

One particularly advantageous arrangement, which includes a sealing member in addition to the window sealing strip and which facilitates assembly of the window, is to be had if the guide means provided on the rearward edge of the window pane is in the form of a guide rail which engages into a rearwardly open guide track, and if the forwardly disposed guide means is comprised of sliding elements disposed on a support rail. Preferably, the forwardly disposed guide channel is C-shaped and is provided at its upper end with a cutout for insertion of the sliding elements. In this instance the window pane, after having been laterally inserted, must be displaced vertically in the guide tracks by a predetermined distance.

This displacement, which is necessary to position the window pane properly for engagement with the window lift mechanism, may be reduced to some degree or eliminated altogether if, in accordance with another feature of the invention, the forwardly disposed guide track has an angled rearwardly directed opening, i.e., if its outer and rearwardly disposed web is partially cut off and the sliding element is provided with a resilient portion which enables the sliding element to be snapped into the guide track at an angle. This arrangement permits the window pane to be inserted into the guide tracks at any particular height.

This is also the case if, in accordance with another feature of the invention, the forwardly disposed guide track is of a greater width than the sliding element and is provided with a portion which is of a width suitable for insertion of the sliding element, and if, after insertion of the sliding element, a profiled stop member is inserted into the guide track for the purpose of guiding the sliding element.

The invention will now be described in conjunction with exemplary embodiments.

FIG. 1 is a side elevation of a vehicle door;

FIG. 2 is a sectional view along line II—II of FIG. 1;

FIG. 3 is a modification of the forwardly disposed window pane guide means in accordance with the sectional view shown at the left of FIG. 2;

FIG. 4 is a view of the sliding element of FIG. 3 as viewed in the direction of the arrow;

FIG. 5 is a schematical view to indicate the directions in which the window pane is inserted;

FIG. 6 is a further modification of the forwardly disposed window guide means;

Figure 9:
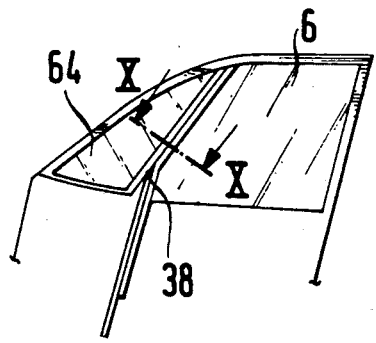
FIG. 9 is another window arrangement for the vehicle door.

Referring to FIG. 1, the vehicle door 2 is provided with an inwardly disposed window frame or window frame means 4 which serves to guide the window pane 6, i.e., the left forwardly disposed edge is supported in a guide rail 28. This guide rail 28 is bordering on one side of a triangular member 10 within which a rearview mirror (not shown) is mounted.

The window frame 4 is located inwardly of the window pane 6 and is comprised of a rolled hollow section and is of the cross-sectional shape illustrated in FIG. 2. A window sealing strip 12 as well as a guide member 14 are secured to the window frame 4. The guide member 14 serves as a rearward stationary guide track means. Both the window sealing strip 12 and the guide member 14 are in the form of extruded elastomeric members made of synthetic or natural rubber. The sealing lip 16 of the window sealing strip 12 is engaging the window pane 6, which has a rearward guide means or guide rail 18 attached to its rearward edge, as for instance by bonding. A nose-shaped portion 20 of the rail 18 extends into the right, i.e., rearwardly disposed opening or mouth portion of the guide member 14. The guide member 14 and the nose-shaped portion 20 are provided with respective undercuts, as shown in FIG. 2, such that the rail member 18, when placed into the guide member 14, will flex and snap into locking engagement therewith.

The forward edge of the window pane 6 is provided with a forward guide means or window retaining member 22 comprising a shank 24 which is provided with one or more, i.e., usually two sliding elements 26. The sliding elements 26, which are molded to the shank 24, are guided in a forward stationary guide track means or guide track 30 formed onto the guide rail 28. The guide rail 28 is provided with a U-channel 32 which serves as a support for the window sealing strip 34. The guide rail 28 is also provided with a flange 36 which serves as a means to connect the guide rail 28 to the door reinforcing member 38. Numeral 40 denotes the cover of the mirror triangle, and numeral 42 the inner molding which is supported by the channel member 32.

Figure 8:
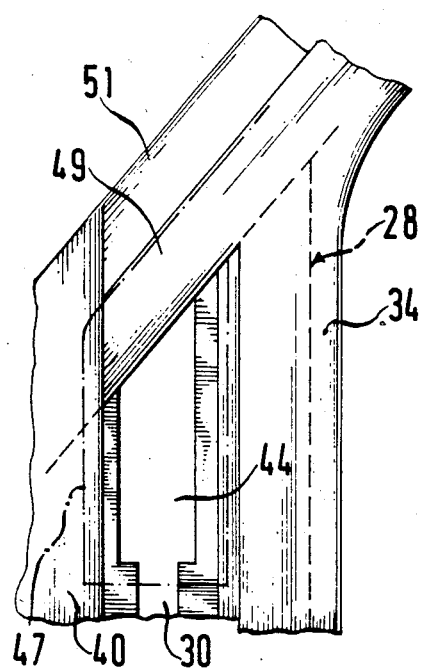
FIG. 8 is a side view of the forwardly disposed window guide means.

Assembly of the window pane 6 proceeds as follows. The window pane 6 is aligned from the outside with the window frame 4, i.e., the sealing strip 12, such that its lower edge is positioned at a level that corresponds to about the upper end of the mirror triangle 10. The window pane 6 is then pushed inwardly and in a forward direction until the nose portion 20 of the rail 18 engages with and snaps into the guide channel 14. In this position the lower sliding element 26 provided on the forward guide means or support rail 22 will abut from the outside against the guide track 30. In order to enable the sliding member or element 26 to enter into the track 30, an opening or cut out 44 is provided at the upper end of said track 30, which is shown in FIG. 8. The opening 44 is wider than the width of the sliding elements 26. The sliding member 26 is obliquely pushed through the opening 44 in the outer walls of the track 30. The window pane 6 is then lowered until an upper sliding element 26 comes to be located in the area of the opening 44. This sliding element is then also pushed through the opening. The window pane 6 is then lowered a little more until it assumes its final upper position, i.e., its closed position.

The configuration of the track 30 permits the web formed by the guide rail 28 to be kept relatively narrow and flat, i.e., the guide rail itself is relatively narrow and flat. The width of the track 30 is very small. The shank 24 of the support rail 22, which closes the gap between the window pane 6 and the guide rail 28, is displaced somewhat inwardly from the edge of the window pane 6. This will make the gap between the support rail 22 and the mirror triangle 10, i.e., the cover 40, somewhat narrower. The sliding elements 26 are enclosed from all sides by the track 30, an arrangement that ensures proper guiding of the sliding elements.

FIG. 3 illustrates another embodiment of the forwardly disposed window guide arrangement. The rearward edge guide means of the window pane 6 is the same as in FIG. 2. The forward edge of the window edge in this embodiment is also provided with a support rail or forward guide means 22' which has a resilient shank portion intermediate its ends and which carries the sliding elements 26' that are molded thereto. The stationary guide means or guide track 30' of the guide rail 28' is without the outer rearwardly disposed leg over its entire length, so that the guide track 30' has an outwardly sloping rearwardly directed open portion 45 that extends over the entire length thereof. The sliding elements 26' are provided with resilient portions 46, as shown also in FIG. 4. The U-channel is forming a sloping web 48. This arrangement permits the sliding elements to be inserted into the guide track 30' from any point of the track 30' and by causing the shank portion of the guide rail 22' to flex to be snapped in position therein, i.e., insertion of the sliding elements 26 into the track may proceed from the rear and at an angle. The arrows in FIG. 5 indicate the approximate directions of insertion for the window pane 6.

One further modification which enables the window pane 6 to be installed in the same or a similar fashion is illustrated in FIG. 6. The sliding elements 26" secured to the forward guide means or support rail 22" may be inserted anywhere along the track 30" through an opening extending over the entire length thereof. A T-shaped rib 54 serves as a means to support an elongate stop member 56 which, after insertion of the sliding elements 26" into the stationary guide track 30", is placed over the rib 54 when the window pane 6 is in a position in which the upper end of the guide track 30" is accessible. The stop member 56 is then pushed downwardly on the rib 54. This arrangement will prevent the sliding member 26" from being dislodged on the track 30", with the leg 58 of the stop member 56 being resiliently biased against the sliding members 26". Furthermore, the leg 58 may be flock-coated. In this arrangement, too, the visible portion of the slot in the guide track 30" through which the guide rail 22" extends is very small.

Figure 7:
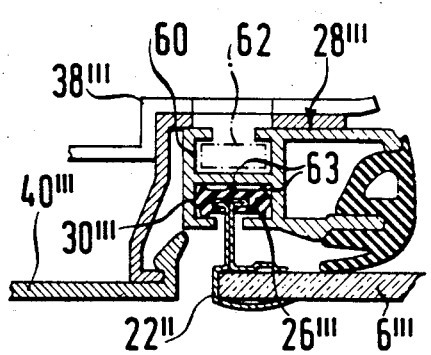
FIG. 7 is a further modification of the forwardly disposed guide track and guide rail.

A further modification of the forwardly disposed guide rail is illustrated in FIG. 7, which corresponds, in principle, to that illustrated in FIG. 2, except for the profile of the forward guide means or guide rail 28''', which has been modified for the purpose of securing the same to the door reinforcing member 38'''. In this arrangement, a C-channel 60 has been added to the rear of the C-channel 30''' which serves to accommodate threaded nuts 62. The threaded nuts 62 are adapted to receive threaded bolts (not shown) for fastening the guide rail to the door reinforcing member 38'''. The sliding member 26''' on the support channel 22''' is provided with linear cams 63 for effecting linear engagement of the sliding elements 26''' in the guide track 30''' in order to ensure easy sliding movement. This modification of the sliding element 26''' is also applicable to the sliding elements 26 to 26" employed in the other exemplary embodiments. The purpose of providing a close fit between the sliding elements and the track is to enable the mirror triangle to be positioned as closely as possible to the support rail 22.

Figure 10:
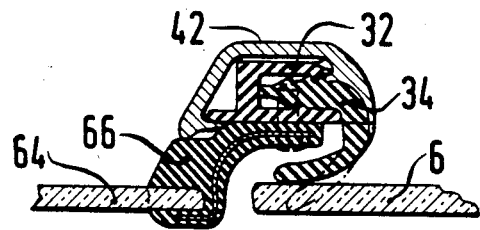
FIG. 10 is a sectional view along line X—X of FIG. 9.
Figure 11:
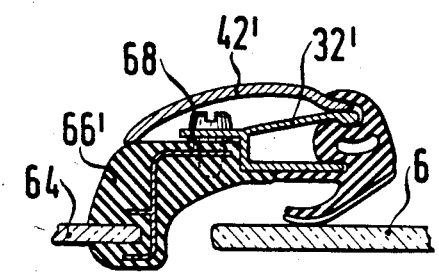
FIG. 11 is a modified form of the sectional view along line X—X of FIG. 9.

FIG. 10 is a sectional view along line X—X of FIG. 9 at a point above the door reinforcing member 38. In this arrangement, the guide track 30 is eliminated, so that there is only the U-channel member 32 for the window sealing strip 34. In this arrangement, the fixed window is fitted to the elongate profiled member in a relatively simple fashion. The inwardly disposed molding 42 may be of very small cross-sectional configuration. FIG. 11 is the same sectional view along line X—X in FIG. 9, but is adapted to be employed with the arrangement illustrated in FIG. 3. The elongate profiled member 66' is attached to a flange 68 of the U-channel member 32' and is covered by the molding 42'.

The embodiments of the invention in which an exclusive property or privilege is claimed are defined as follows:

1. In a door for an automotive vehicle having body work parts, a window pane with forward and rearward edges and which is supported by said door for vertical movement therein, a window frame means on said door located interiorly of said window pane, forward and rearward stationary guide track means carried by said window frame means and located inwardly of said window pane, forward and rearward guide means secured to said window pane adjacent its forward and rearward edges and which are slidably received within said forward and rearward stationary guide means, respectively, for vertical movement relative thereto and such that the window pane is substantially flush with adjacent door and body work parts, and seal means carried by said window frame means for sealingly engaging said window pane along its interior side at locations inwardly of said forward and rearward edges, the improvement being that said rearward stationary guide track means is located forwardly of said rearward edge of said window pane and has an opening which faces rearwardly thereof, said rearward guide means is located inwardly of and projects forwardly of said rearward edge of said window pane and wherein said forward guide means extends transversely inwardly of said window pane and said forward guide track means has an opening facing toward said window pane whereby the window pane is assemblable to said door from a location laterally outwardly of said door by moving the pane at its rearward end inwardly and forwardly of said vehicle to insert the rearward guide means into the rearwardly facing opening of the rearward stationary guide track means and then inserting the forward guide means into the forward stationary guide track means, and means for retaining the forward guide means within the forward stationary guide track means so that the window pane is guided in all directions upon being assembled to the door and moved relative thereto.

2. In a door in accordance with claim 1 and wherein the forward guide track means has its outer and rear sides shaped so that the opening therein also faces obliquely rearwards and the shank portion of the forward guide means is resilient to permit an oblique snap movement of the forward guide means into the forward stationary guide track means.

3. In a door in accordance with claim 1 and wherein the forward guide track means has a cross-section which forms two back-to-back C-shaped profiles, one of which serves as a guide path for the forward guide means and the other of which receives threaded nuts for securing the guide rail to the door frame means.

4. In a door in accordance with claim 1, and wherein said rearward guide means includes a resilient section and a nose shaped end portion which is snap fittingly received within the stationary rearward guide track means.

5. In a door in accordance with claim 4 and wherein said forward guide means includes a resilient shank section to enable the forward guide means to be snap fittingly received within said forward stationary guide track means.

6. In a door for an automotive vehicle having body work parts, a window pane with forward and rearward edges and which is supported by said door for vertical movement therein, a window frame means on said door located interiorly of said window pane, forward and rearward stationary guide track means carried by said window frame means and located inwardly of said window pane, forward and rearward guide means secured to said window pane adjacent its forward and rearward edges and which are slidably received within said forward and rearward stationary guide means, respectively, for vertical movement relative thereto and such that the window pane is substantially flush with adjacent door and body work parts, and seal means carried by said window frame means for sealingly engaging said window pane along its interior side at locations inwardly of said forward and rearward edges, the improvement being that said rearward stationary guide track means is located forwardly of said rearward edge of said window pane and has an opening which faces rearwardly thereof, and said rearward guide means is located inwardly of and projects forwardly of said rearward edge of said window pane and wherein said forward guide means extends transversely inwardly of said window pane and said forward guide track means has an elongated vertical opening facing toward said window pane and with the opening adjacent its upper end being formed with a cutout so as to be wider than the width of the forward guide means whereby the window pane is assemblable to said door from a location laterally outwardly of said door by moving the pane at its rearward end inwardly and forwardly of said vehicle to insert the rearward guide means into the rearwardly facing opening of the rearward stationary guide track means and then inserting the forward guide means into the cutout of the opening in the forward stationary guide track means and lowering the window pane whereby the forward guide means will extend through the elongated opening and be slidably retained by the forward guide track means.

7. In a door in accordance with claim 6, and wherein the forward guide means is insertable into the cutout of the opening in the stationary guide track means in a direction transversely and inclined thereto.

8. In a door in accordance with claim 6 and wherein the forward guide stationary track means is C-shaped in cross-section and the forward guide means includes a shank portion provided with sliding elements at its end remote from the window pane which are insertable through the cutout in the opening of the forward stationary guide track means.

9. In a door in accordance with claim 8 and wherein the sliding elements are provided with linear cams for contact and guiding in the stationary guide track means.

10. In a door for an automotive vehicle having body work parts, a window pane with forward and rearward edges and which is supported by said door for vertical movement therein, a window frame means on said door located interiorly of said window pane, forward and rearward stationary guide track means carried by said window frame means and located inwardly of said window pane, forward and rearward guide means secured to said window pane adjacent its forward and rearward edges and which are slidably received within said forward and rearward stationary guide track means, respectively, for vertical movement relative thereto and such that the window pane is substantially flush with adjacent door and body work parts, and seal means carried by said window frame means for sealingly engaging said window pane balong its interior side at locations spaced inwardly from its forward and rearward edges, the improvement being that said rearward stationary guide track means is located forwardly of said rearward edge of said window pane and has an opening which faces rearwardly thereof, said rearward guide means is located inwardly of and projects forwardly of said rearward edge of said window pane and wherein said forward guide means extends transversely inwardly of said window pane and said forward guide track means has an opening facing both rearwardly and toward said window pane which is wider than said forward guide means whereby the window pane is assemblable to said door from a location laterally outwardly of said door by moving the pane inwardly and forwardly of said vehicle to insert the rearward guide means into the rearwardly facing opening of the rearward stationary guide means and to insert the forward guide means into the rearwardly facing opening portion of said forward guide track means and stop means connectable to said forward stationary guide track means for slidably engaging and retaining the forward guide means within the forward stationary guide track means when assembled thereto.

11. In a door in accordance with claim 10 and wherein the stop means resiliently engages the forward guide means.

12. In a door according to claim 11 and wherein the stop means is pushed onto a stay located on the forward stationary guide track means.

13. In a door in accordance with claim 12 and wherein the stop means is provided with a covering lip resting against the forward stationary guide track means.

* * * * *